United States Patent [19]

Krueger

[11] Patent Number: 4,578,418

[45] Date of Patent: Mar. 25, 1986

[54] TWO-PACKAGE URETHANE MAINTENANCE PRIMER

[75] Inventor: Achim R. Krueger, Cherry Hill, N.J.

[73] Assignee: E. I. Du Pont de Nemours and Company, Wilmington, Del.

[21] Appl. No.: 688,024

[22] Filed: Dec. 31, 1984

Related U.S. Application Data

[60] Division of Ser. No. 574,250, Jan. 26, 1984, Pat. No. 4,522,879, which is a continuation-in-part of Ser. No. 314,972, Oct. 26, 1981, abandoned.

[51] Int. Cl.[4] .............................. C08K 3/08; C08K 5/09
[52] U.S. Cl. .................................... 524/400; 524/439; 524/441
[58] Field of Search ..................... 524/400, 439, 441

[56] References Cited

U.S. PATENT DOCUMENTS 3,408,318 10/1968 Madison ................................ 260/18
4,383,070 5/1983 Markusch et al. ................... 524/441

FOREIGN PATENT DOCUMENTS 737541   6/1966  Canada ............................... 524/439
0094261 11/1983  European Pat. Off. ............ 524/439
3018765 11/1981  Fed. Rep. of Germany ...... 524/439
49-25428 6/1974  Japan .................................. 524/441

Primary Examiner—Joseph L. Schofer
Assistant Examiner—N. Sarofim

[57] ABSTRACT

A two-package air-drying coating system resistant to strong organic solvents, free from toxic heavy metals and excellent, for example, as a primer for adhering urethanes or epoxy enamels to previously painted steel, is based upon a rheologically desirable mixture of (1) plate-like filler, e.g., talc, (2) carbon black, and (3) barium lanolate with a binder composed of a polyol and a polyisocyanate crosslinking agent.

4 Claims, No Drawings

TWO-PACKAGE URETHANE MAINTENANCE PRIMER

RELATED APPLICATION

This is a division of application Ser. No. 574,250, filed Jan. 26, 1984, now U.S. Pat. No. 4,522,879 which is a continuation-in-part of my copending application Ser. No. 314,972, filed October 26, 1981 now abandoned.

BACKGROUND OF THE INVENTION

1. Field of the Invention

This invention relates to primer paints having an unusual, improved rheology that allows them to be applied at high, uniform film thickness with excellent coverage of sharp edges. They provide excellent protection against corrosion even when applied to rusted steel which has been only marginally prepared. The paints, for example, may be used on exposed large tanks for the reception of a topcoat reducing the amount of labor needed.

2. Prior Art

Johnson U.S. Pat. No. 2,858,285 discloses barium soaps, such as the lanolate, in corrosion-inhibiting paints based, for example, on alkyd resins.

Swanson U.S. Pat. No. 3,136,653 and Simon U.S. Pat. No. 4,232,090 illustrate some prior art primer coatings.

Madison U.S. Pat. No. 3,408,318 and Ginsberg et al U.S. Pat. No. 4,239,539 show comminuted metallic zinc in some coating materials.

Krueger U.S. Pat. No. 4,156,678 shows hydroxylated (meth)acrylic random copolymers, interpolymers, and polyisocyanates useful in the invention. Krueger's ultimate products, furthermore, make excellent topcoats for the instant primers.

Strolle et al U.S. Pat. No. 4,281,078 (Strolle) shows hydroxylated random copolymers prepared by copolymerizing at least one hydroxyalkyl ester of acrylic or methacrylic acid with at least one other ethylenically-unsaturated monomer and polyester polyols with methods for their preparation and organic polyisocyanates.

H. T. Dickman, "Organic and Inorganic Binders in Zinc-Rich Coatings", Modern Paint and Coatings, Vol 73, No. 3, pp. 32–38 (March 1983), discloses test results on some zinc-containing coatings.

All of the above art is specifically incorporated by reference herein.

DESCRIPTION OF THE INVENTION

The present invention has among its principal objects:

1. Provision of an environmentally acceptable primer paint which protects a substrate, particularly a ferrous surface, and prepares it for a topcoat;
2. Provision of a primer that can be laid down directly on previously painted metal surfaces, reducing or eliminating the need for sandblasting;
3. Provision of a paint with improved rheological properties leading to a high film build, e.g., 5-mil dry thickness in contrast to the customary 2-mil, and improved edge coverage;
4. Provision of a primer paint which avoids the use of toxic heavy metals such as lead and chromium; and
5. Provision of a primer curable at relatively low temperatures, i.e., down to 10° F.

The above-mentioned and other objects are now achieved by a primer paint comprising an organic solvent, polyol (acrylic or polyester) binder, a ternary pigment mixture comprising a plate-like pigment, carbon black, and barium lanolate and, at the time of use, a cross-linking agent for the polyol. More specifically, the primer is generally a two-package system in which Package 1 comprises a dispersion in an organic solvent of a binder consisting of (1) at least one hydroxyl-bearing methacrylate or acrylate polymer and/or (2) at least one hydroxylcontaining polymeric polyester or polyester polyol, the ternary pigment and selected adjuvants (in this specification, "dispersion" will include molecular dispersions or solutions, (meth)acrylate polymers and the polyesters will be spoken of as "prepolymers", and the "pigment" will include desirable extender). Package 2 consists of a conventional polyisocyanate cross-linking agent for the polyol really completing the binder.

The dispersion and the polyisocyanate are mixed at the time of use, and the mixture is applied to a surface to be protected by any convenient application means, e.g., by brush, roll or spray, etc. The primer dries in air very rapidly, minimizing the time when tacky material is vulnerable to soil and allowing rapid recoat.

The compositions of this invention can be used directly as a topcoat, but, if only because of appearance, are generally primers for topcoating with polyurethane, epoxide or the like.

In another aspect of the invention, a sacrificial metal such as zinc can be used with the binders named.

DETAILS OF THE INVENTION

The hydroxylated prepolymers of Package 1 of this invention are generally either (1) hydroxylcontaining acrylic (i.e., acrylate or methacrylate) polymers or (2) hydroxyl-containing polymeric polyesters. Any polymer used should contain about 1–10% by weight of hydroxyl groups, with 1.5–6% preferred, and be soluble in organic solvents.

The acrylic prepolymers usable are formed from two or more conventional ethylenically unsaturated polymerizable monomers, one of which is always at least one hydroxyalkyl acrylate or methacrylate in which the alkyl group contains 2–18 carbons. Such monomers include hydroxyethyl methacrylate, hydroxypropyl methacrylate, hydroxybutyl methacrylate, hydroxyoctyl methacrylate and corresponding acrylates and the like. Preferred are hydroxyalkyl methacrylates or acrylates in which the alkyl groups contain 2–4 carbons, e.g., 2-hydroxyethyl acrylate and the like.

Typical ethylenically unsaturated monomers that can be used with the hydroxylated monomer are, for example: vinyl and vinylidene chlorides; olefins, such as ethylene, propylene and the like; vinyl acetate; conjugated dienes having 4 to 10 carbon atoms, such as butadiene; aromatic hydrocarbons having vinylene groups, such as styrene, and alkyl-substituted styrene, such as α-methyl styrene; alkyl maleates, such as dibutyl maleate; vinyl pyrrolidone; methacrylonitrile and acrylonitrile; esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, and corresponding acrylates; or mixtures of these monomers. Particularly useful monomers include styrene, methyl methacrylate, butyl methacrylate, ethyl acrylate, acrylonitrile, and vinyl pyrrolidone.

For the purposes of this invention, the preferred acrylic prepolymer contains at least three monomers, i.e., the hydroxylated acrylic monomer, at least one other acrylic monomer, and styrene. Preferred monomers are 2-hydroxyethyl acrylate, a lower alkyl methacrylate and a longerchain alkyl methacrylate, e.g., ethyl and lauryl methacrylates, and styrene, with the hydroxylated monomer comprising at least 6.6% by weight and styrene, 20–70%.

The acrylate or methacrylate prepolymer is made by conventional methods: see, for example, the Strolle patent noted. The precursor monomers and catalyst (azo, peroxide) are mixed together in an organic solvent such as Cellosolve ® acetate or ethyl acetate and refluxed until polymerization is complete. Both monomers and prepolymers are very soluble in organic solvents and the product need not be separated from solvent used in its preparation. The result is a high-solids solution, ca. 60–80% by weight, with 70% preferred. High concentration of prepolymer is useful in applications to reduce pollution caused by solvent. The molecular weight $M\overline{M}_n$ (number average molecular weight) is about 2,000–10,000 with about 4,000 preferred.

Any organic solvent used either in the preparation of the prepolymer or in forming a dispersion therewith should, of course, be anhydrous and free from hydroxyl groups. Otherwise, general organic solvents may be used. Cellosolve ® acetate and ethyl acetate are preferred. Aromatics such as xylene are usable but are less preferred because of pollution problems.

To a prepolymer solution prepared as above or diluted is added the ternary pigment necessary for the primer. This pigment is devoid of heavy toxic metals, notably lead and chromium, but comprises three chemicals which may be regarded as rheological control agents. The first is a relatively inert material in the form of platelets. The platelets give barrier properties eliminating the need for heavy metals in addition to providing good rheology.

Several chemicals are commercially available in platelet form, e.g., silicates (magnesium and sodium silicates, hydrous aluminum silicate, glass, mica, quartz); metals (aluminum, stainless steel, nickel); oxides (iron and zinc oxides, alumina); salts (organic salts of calcium, barium); some esters, e.g., poly(ethylene terephthalate) (Mylar ®); etc. Although spherical glass bubbles are not platelets, when ground or crushed they are sufficiently plate-like to be useful. A preferred material is talc (magnesium silicate) but commercially available micaceous iron oxide (metallic black-brown platelets) is equally effective. More than one type of platelet can be used simultaneously, if desired. Between 20 and 95% of the pigment employed is generally in platelet form.

Carbon black is the second agent essential to the rheology of the primer. This may be in any of the commercial varieties, e.g., channel black, lamp black, furnace black, etc. Between about 1 and 5% by weight of the total weight of pigment should be carbon black.

The third rheological control agent necessary is barium lanolate or an equivalent. This chemical, the barium soap of lanolin fatty acid, is discussed by Johnson U.S. Pat. No. 2,858,285 and may be obtained from Wellman Industries. Barium lanolate is used to the extent of about 1–6.0% by weight of the total pigment weight (0.7–4.2% total weight of solids). Zinc, aluminum or calcium stearates, etc., may be substituted for the lanolate but lanolates are preferred. Barium lanolate acts also as a pigment dispersant and antisettling agent and as a corrosion inhibitor. Corrosion inhibition is achieved by the soluble barium cation scavenging sulfate contaminant and by the lanolate reducing water permeability and thereby improving blister resistance and retarding filiform- and creep-corrosion. Water permeability through the primer films can be monitored by measuring electrical resistance through the primer between sea water and metal substrate (see Example 5, below).

The rheological properties provided by the ternary mixture are very good as is evident from its hysteresis curve. This curve is a plot of viscosity (or log viscosity) versus shear rate (or log shear rate). It is obtained by measuring viscosity beginning at a low shear rate raised successively until a high shear rate is reached. Measurements are then taken as the shear rate is returned to its initial value. Normally, a curve enclosing an area is obtained for a paint. In this case, substantially a single line is obtained.

In practice, viscosity here is rapidly reduced by shear, e.g., in passing through a spray gun, but the viscosity builds up again extremely rapidly when the paint is allowed to stand, e.g., on a surface which has just been painted. The results are that pigment does not settle in the can because of the high viscosity at low shear and that the paint sprays easily because of the low viscosity at high shear rates. Furthermore, after spraying the paint does not run or sag because of the high viscosity at low shear rate. Consequently, a thick layer of wet film can be built up in one or two passes without any problems. Ordinary primers do not recover viscosity as fast after spraying. Thus, they sag and run when one attempts to build up too thick a wet coating. Even worse, they tend to become thin at sharp edges. Corrosion can then occur at the edges.

In addition to a high viscosity at low shear rates, the paint exhibits a yield stress. Unless a shear stress above a certain level is applied, the paint does not flow at all. This phenomenon can be observed in a number of materials, such as some foods, putty, spackling compounds, some adhesives and some caulking compounds but these materials cannot be sprayed because the structure causing the yield stress does not break down fast enough under high shear. Some conventional paints, including some primers, also exhibit a yield stress and lose it on spraying but do not recover it fast enough after spraying to exhibit the lack of sagging, running, or edge thinning shown here.

Some comparisons can be made with commercial materials (see Example 1E, below):

1. Both the claimed and the commercial primer show low viscosity at high shear rate (a viscosity of 1.2–1.5 poise when measured at a shear rate of 13000 sec$^{-1}$). Both can therefore be sprayed.

2. The claimed primer shows a high yield value (202.0 dynes/cm$^{-2}$) which allows thick uniform films to be applied in one coat. Uniform coatings of up to 20 mils in wet thickness have been obtained. The commercial primer has a low yield value (0.0 dynes/cm$^{-1}$) and uniform films cannot be applied in one coat.

3. When viscosity is measured at low shear rate (0.2 sec$^{-1}$), the present primer exhibits a high viscosity (800 poises), also making it easy to get thick films. The commercial primer has a lower viscosity (120 poises) when the viscosity is measured at low shear rate (0.2 sec$^{-1}$). Consequently, it is harder to apply the commercial primer at high film thickness.

The rheological properties of this primer are very valuable when painting objects, such as oil tanks, where scaffolds must be used. The workman can spray the entire required thickness without moving his scaffold because he does not need to wait between spray passes.

Similar considerations apply to oceanic oil rigs and other large structures.

The ternary pigment mixture noted can be used with other pigments. Zinc oxide (amphoteric; aids in corrosion protection) and red iron oxide (customary), in particular, are frequently used. About 5-25% of zinc oxide and 10-50% of the iron oxide may be useful. Heterogeneous roughly hewn nodular extender particles such as carbonates, e.g., calcium or particularly barium carbonate, can be employed especially where acidity resulting from smoke emissions or acid rain is anticipated. Barium sulfate can also be used.

The total composition of the pigment, including the ternary rheological mixture, is given by the following Table I:

TABLE I

| Pigment | Percentage by Weight | Preferred (%) | Most Preferred |
|---|---|---|---|
| Plate-like pigment* | 20-95 | 50-84 | 70 |
| Carbon Black | 1-5 | 1-5 | 2 |
| Zinc Oxide | 5-25 | 5-25 | 14 |
| Red Iron Oxide | 10-20 | 10-20 | 14 |
| | 100 | 100 | 100 |

*Talc or micaceous iron oxide is preferred.

The ingredients which make up Package 1 of the invention are readily assembled. A solution of prepolymer prepared as noted is adjusted to the proper solids content, i.e., ca. 37%, by means of solvents such as Cellosolve ® acetate and the various solid materials added thereto. The mixture is then ground for about 24 hours in a ball mill until a substantially homogeneous nonsettling or stable suspension is obtained. Table II gives some characteristics of the pigmented Package 1 materials:

TABLE II

| | Limits | Preferred |
|---|---|---|
| P/B (Pigment to Binder Ratio)* | 60/100-600/100 | 213/100 |
| PVC (Pigment Volume Concentration) | 15-65% | 42% |
| % Vol. Solids | 15-82% | 50% |
| % Wt. Solids | 55-92% | 67% |

*Here B (the binder) includes only the prepolymer.

Package 2 is a solution in an organic solvent of a polyisocyanate, substantially a polyisocyanate as disclosed in my above-mentioned U.S. Pat. No. 4,156,678, especially at Col. 2, line 37, through Col. 3, line 18. Some of these compounds are known as Desmodurs ® and Mondurs ®, readily available commercially and quite useful here.

The polyisocyanate of Package 2 is used with the hydroxylated prepolymer of Package 1 in the mole ratio -NCO/-OH 0.1/1.0-2.2/1.0, with 0.85/1-1.15/1 being preferred. It is dissolved in an organic solvent as is the prepolymer and, since some aromatics can be tolerated, a Cellosolve ® acetate/ethyl acetate/xylene mixture is generally employed (69/23/8% by weight). Data on the mixed Packages are given in Table III:

TABLE III

| | Limits | Preferred |
|---|---|---|
| P/B* | 50/100-400/100 | 143/100 |
| PVC | 15%-60% | 33% |
| % Vol. Solids | 45%-80% | 50% |
| % Wt. Solids | 50%-90% | 67% |

*Here the binder includes polyisocyanate as well as prepolymer.

When it is desired to use the present coating composition, it is merely necessary to mix the two packages together and apply the mixture to the desired surface. Although the mixture dries rapidly in air, it will remain sufficiently fluid in the air for application, i.e., with a viscosity below about 1000 cps (centipoises) for up to about 8 hours. In general, any substrate, particularly a metallic substrate, can be protected by the present primer. Ferrous surfaces, e.g., of iron or steel, can readily be coated. A rusty surface, for example, need only be hand cleaned although performance is improved with improved cleaning. The primer can also be put down directly on a previously painted surface. In any event, structural steel girders, steel oil storage tanks, oil rigs, pipes, steel sheeting for ships, trucks, etc., are easily protected by the primers.

Application can be by any of the conventional methods such as by spraying where legally permitted, rollers or brush. The primer dries rapidly in air after application, e.g., in about 5-8 hours, at ambient temperatures of 20°-25° C., and is then ready for application of the outer coat. The superimposed coat can be usual commercial varieties, e.g., acrylic urethane such as Imron ® or epoxide such as Corlar ®.

It is sometimes desirable to accelerate the reaction between isocyanate and hydroxyl of the polyol, particularly in cold weather or when a quick-drying shop primer is needed. Conventional tertiary amines such as N,N-dimethyldodecylamine; N,N,N',N'-tetramethyl-1,3-butanediamine; N,N,N',N'-tetramethylethylenediamine; triethylamine; N-ethylmorpholine; etc., or organo-metallic compounds such as stannous octoate, etc., can be used. For the purposes of this invention, a mixture of dibutyltin dilaurate (DBTDL) and 1,4-diaza(2,2,2)bicyclo-octane (DABCO; triethylenediamine) has been satisfactory (see Example 4 below). The mixed catalyst is preferably added separately to the polyisocyanate and polyester polyol components as substantially in a third package.

In the alternative embodiment of the invention, the hydroxyacrylic prepolymer of Package 1 is replaced by a polyester polyol with terminal and/or pendant hydroxyl groups. The polyesters employed are made conventionally from dicarboxylic acids (or anhydrides, where they exist) such as the phthalic acids and the like and an excess of monomeric glycol. Branching as produced by a branching polyol such as trimethylolpropane or pentaerythritol is preferred but not necessary. The degree of branching is determined by the mole ratio of the ingredients as shown in Example 3. Small amounts of monocarboxylic acids, e.g., benzoic acid, may be used if desired (to defunctionalize some hydroxyl groups). The resulting polyester should have about 1-10% by weight of hydroxyl. The cited Strolle patent, for example, shows usable polyester polyols, with precursors and preparation. The polyester polyol is packaged and applied like the hydroxylacrylic prepolymer above and with similar results. It is found in practice that the polyester aspect of the invention can give a somewhat higher concentration of solids than the acrylate.

A still further addition that can be made to the present pigment is a rust-inhibiting or sacrificial metal (Madison U.S. Pat. No. 3,408,318) such as finely divided zinc. This improves performance against weathering (see Example 7, below). Up to 87% by weight of the total pigment weight is employed (0–80% by total weight of solids). The zinc can be included in Package 1 or it can be added separately when the entire primer mixture is made up for application, e.g., as by spraying. Such a zinc-containing primer functions virtually as well as commercial inorganic zinc-containing silicate-based primers and better than organic zinc-containing primers based on high-molecular weight copolymers of bisphenol "A" and epichlorohydrin against which it was tested. Other finely divided metals, e.g., aluminum or magnesium, can be used if desired.

EXAMPLES

There follow some examples illustrating the practice of the invention. Unless otherwise noted, in these examples all parts, proportions and percentages are in terms of weight and temperatures, in degrees centigrade.

EXAMPLE 1

A. Hydroxylated Resin

A hydroxyacrylate polymer was prepared at reflux (ca. 145°–155°) in Cellosolve ® acetate from premixed styrene (31.5%), ethyl methacrylate (31.5%), lauryl methacrylate (25.0%) and 2-hydroxyethyl acrylate (12.0%) with t-butyl peracetate as catalyst. The product was a 70% solids solution of the hydroxyacrylate polymer of the composition determined by the monomers: $\overline{M}_n = 4000$; Vis = 2500 cps; -OH = 1.76%.

B. Dispersion

The polymer solution of A (27.91%) was diluted with Cellosolve ® acetate (18.60%) and ethyl acetate (6.04%), and pigment (47.45%). Pigment consisted of talc (66.66%), carbon (1.98%; furnace black), barium lanolate (3.92%), zinc oxide (13.72%), and iron oxide (13.72%). All of these materials were mixed and milled together for about 18 hours to a fineness of 0.5 mils. This process formed a stable brown dispersion: Solids = 67.0%.

C. Crosslinking Agent

A mixture of polypropylene glycol (49%), trimethylolpropane (8%) and toluene diisocyanate (43%) was reacted together during reflux in a anhydrous solvent mixture of xylene/Cellosolve ® acetate (70/30) under a nitrogen blanket. An isocyanate-terminated prepolymer of about 75% gravimetric solids was obtained with an average -NCO content of about 9.4% based on solids. This prepolymer was further diluted with ethyl acetate to yield a final composition of 58.14% solids in a solvent blend of Cellosolve ® acetate (17%), xylene (40%), and ethyl acetate (43%).

D. Assembled Primer

The dispersion of B and the crosslinking agent of C were mixed together in a volume ratio of four to one (4:1), respectively. This two-component mixture is stable for use as a paint (or has a "usable potlife") in excess of twenty-four (24) hours during which time it must be used. Upon further aging, reaction of the two components introduced through their respective package components leads to increasing polymeric molecular weights accompanied by an increase in viscosity ultimately producing an insoluble gel.

The two-component primer mixed as described was sprayed onto 4"×12" hot-rolled steel (AISI-1010, 16 gauge) panels to a dry film thickness of 2 to 3 mils. Simultaneously, panels of the same substrate were prepared by applying commercial red lead oil-alkyd metal primers as well as two-package epoxy/polyamide metal primers to the same dry film thickness. The panels were air dried at ambient temperatures for seven days and were then coated with a urethane enamel to 2-mils dry film thickness. These painting systems were subjected to accelerated corrosion testing in a salt fog chamber controlled at 95°±2° F. with an aqueous 5% sodium chloride solution. This test is well established in the industry and is based on ASTM B-117 method.

After 816 hours' exposure in the salt fog chamber, the painting system using the commercial control red lead oil-alkyd primer had developed severe blistering and rusting on the face of the panel. The commercial control epoxy/polyamide primer system showed face-blistering at 1000 hours of exposure, while the two-component urethane primer system showed no face-blistering after 2300 hours of exposure.

E. Shear Tests

Shear tests with a "Rotovisco" ® viscometer were run on a freshly prepared sample of primer as assembled under D, above, to measure its rheological characteristics. Comparison tests were conducted with a commercial oil/alkyd red lead primer. The urethane primer exhibited a "shear thinning" behavior and lent the low viscosities and excellent application properties typical of spray and brush application but recovered extremely fast to high viscosities under very low shear rates exerted on a wet paint layer or a vertical surface. The data in Table IV explains the capacity for achieving high film build and excellent sharp edge coverage:

TABLE IV

| | Shear Rate | | Yield Value |
|---|---|---|---|
| | 0.2 sec$^{-1}$ | 13,000 sec$^{-1}$ | Dynes/cm$^2$ |
| Test Primer | ca. 800 ps | 1.2–1.5 ps | 202.0 |
| Commercial Primer | 120 ps | 1.2–1.5 ps | 0.0 |

EXAMPLE 2

A. A hydroxyacrylate copolymer was made up as in Example 1 except that the styrene/ethyl methacrylate/lauryl methacrylate/2-hydroxylethyl acrylate weight ratio was 25/25/20/30: -OH = 4.4%; $\overline{M}_n = 4000$.

B. A brown dispersion was prepared as in Example 1 except that the resin of Example 2A was substituted.

C. Desmodur ® N-75, a 75% solids solution of an aliphatic polyisocyanate prepolymer commercialized by Mobay Chemical Corp., was diluted to 53.6% solids with ethyl acetate for use in conjunction with the primer prepared in Example 2B.

D. Four volumes of the dispersion of Example 2B were mixed with one volume of cross-linker of Example 2C. This primer, together with commercial control metal primers such as epoxy/polyamide as well as several red lead and oil primers, was applied to 4" to 12" panels of hotrolled steel (AISI-1010; 16 gauge). These panels had been previously exposed to the elements for nine months for rusting and subsequently cleaned with a wire brush to simulate actual field conditions in the industry. These primed panels were allowed to dry for a week and then coated with a urethane enamel. These systems were evaluated by salt spray testing as in Example 1 D. The system based on the urethane primer of this invention showed no face-blistering after 2100 hours of exposure. All the other systems showed blistering at a 768-hour check and failure due to blistering at the 1250-hour check.

EXAMPLE 3

A. A polyester was prepared by reacting under reflux in ca. 3% xylene, pentaerythritol, benzoic acid, neopentyl glycol, isophthalic acid, phthalic anhydride and adipic acid in the mole ratio 3.2/6.4/12.8/4.0/4.0/2.0. Heating was continued with removal of water until the pot temperature reached 215°. The batch was cooled to 80° and thinned with ethyl acetate: Solids=85%; -OH=6.32%; Acid No.=20-30.

B. A stable dispersion was prepared by grinding in steel ball media to a fineness of 0.5 mils: polyester resin as prepared in Example 3A (32.67%); Cellosolve ® acetate (16.83%); talc (33.66%); zinc oxide (Kadox 515) (6.93%); red iron oxide (6.93%); furnace black pigment (Raven 500) (1.00%); and barium lanolate (1.98%).

C. A crosslinker was prepared by diluting Desmodur E-21, a 100% solids polyisocyanate prepolymer available from Mobay Chemical Corp., to 75% solids with xylene.

D. The dispersion of Example 3B was blended with the crosslinker of Example 3C in the weight ratio 2:1. This primer was sprayed together with control commercial red lead and oil/alkyd metal primers over pre-rusted hand/wire brush-cleaned 4"×12" steel panels as described in Example 2 above. After drying, these panels were coated with the same urethane enamel as above and placed in Florida at 5° angle from horizontal facing south. After six months of exposure, the commercial red lead and oil/alkyd primed system had developed considerable blistering. The urethane-primed system of this invention was in immaculate condition.

EXAMPLE 4

A series of tests were made on the mixed primer of Example 1D to determine the effect of catalysts on drying time. The catalyst used was dibutyltin dilaurate (DBTDL) alone and in conjunction with triethylenediamine (DABCO). The paint samples were equilibrated to 25° and paint-cure was measured at 25°.

The mixed primer was further mixed with various catalyst concentrations. Films were cast from these samples on 5"×7" glass plates with a 10-mil clearance Bird film applicator in accordance with ASTM-D-823-53 except that the applicator blade was hand drawn. When the primer films were tack free, they were overcoated with a commercial polyurethane enamel and a commercial epoxy/polyamide enamel, respectively, both containing high levels of strong and potent solvents. The primer films were not attacked by these strong solvents, and the enamels dried out flawlessly and at high-gloss levels.

The effect of catalyst on the film cure is reflected in the tack-free time and the potlife summarized in Table IV:

TABLE IV

| Catalyst* (% DBTDL/% DABCO) | Potlife | Tack Free |
| --- | --- | --- |
| None | 48 hrs | 4.5 hrs |
| 0.05/0.00 | 8 hrs | 3.25 hrs |
| 0.05/0.06 | 6 hrs | 2.45 hrs |
| 0.10/0.00 | 6 hrs | 2.45 hrs |
| 0.10/0.06 | 3.5 hrs | 2 hrs |
| 0.10/0.12 | 1.5 hrs | 1.5 hrs |

*% Catalyst based on resin solids.

The catalyst level of 0.05% DBTDL-0.06% DABCO based on resin solids of mixed primer of Example 1 was used to spray a few structural steel I-beams and cross-members in a chemical installation at 6° C. By nightfall the temperature had dropped to −4° C. Next morning the primer was tack free and cured hard. It was then overcoated with commercial urethane enamel with excellent results and appearance. The potlife at these temperatures exceeded an eight-hour work shift.

From these results it is considered that, between 50°-100° F. (10°-37.78° C.), no catalyst is needed; between 30°-50° F. (−1.11°-37.78° C.), the 0.05/0.06 ratio is desirable; and between 10°-30° F. (−12.22°-1.11° C.), the 0.10/0.12 ratio is desirable.

EXAMPLE 5

Tests were performed on panels coated with primer containing various levels of barium lanolate.

A. A series of 4"×12" cold-rolled steel panels was coated with the primer of Example 1D alone and mixed respectively with three different amounts of barium lanolate in four groups, i.e., (1) no lanolate; (2) 0.06 lbs/gal; (3) 0.12 lbs/gal; (4) 0.18 lbs/gal., the lanolate being added with stirring to the mixture of components while the primer was assembled. The mixtures were sprayed on the panels to give a coating of a wet thickness of 5 mils. The coatings were allowed to cure at ambient temperature for 24 hrs and a commercial urethane topcoat 2-mil thick was applied to some of the panels.

B. Two tests were run upon panels prepared in A with results given in Table V.

Panels without a topcoat were tested for the effect of barium lanolate on sea water-permeability. In this test, a panel was used as the bottom of an electrical cell, sea water put in the cell and the ohmic resistance measured between the bottom of the cell functioning as an electrode and another electrode placed in the sea water. Results are given in Table V in terms of value read by the ohmmeter in ohms/cm$^2$33 10$^8$.

The second test was the blister resistance test in which top-coated panels were exposed to 100% RH (relative humidity) at 105° F. for the indicated times:

TABLE V

| Panel Group | Sea Water Permeability | | | Blister Resistance | |
| --- | --- | --- | --- | --- | --- |
| | 1 day | 5 days | 40 days | 23 Days | 101 Days* |
| 1 | 270 | 50 | 63 | Slight blistering | DLG |
| 2 | 740 | 560 | 590 | None | CMG |
| 3 | 2100 | 1400 | 1500 | None | CMS |
| 4 | 2400 | 1800 | 1800 | None | None |

*The three-letter code refers to the blisters by number, size and distribution: DLG = dense, large, general; CMG = considerable, medium, general; CMS = considerable, medium, spotty.

EXAMPLE 6

Sea water-permeability and blister resistance tests were run on panels of Group 4 from Example 5 and panels coated with a commercial red lead oil/alkyd primer. A knife test was also made. In this test, the panel is scraped to determine how tough and hard the film is and to estimate adhesion. "Excellent" means that it is very difficult to scrape off the paint, and "very poor" means that it is easy to scrap off the paint. Results are given in Table VI:

TABLE VI

| | Sea Water Permeability | | | Blister Resistance | | |
|---|---|---|---|---|---|---|
| | 1 Day | 5 Days | 37 Days | 52 Days | 37 Days | Knife Test |
| Test Primer | 6880 | 3600 | 3000 | None | None | Excellent |
| Commercial | 21 | 6.2 | 4.6 | CMG | DLG | Very Poor |

EXAMPLE 7

Metallic zinc powder was added to the primer of Example 1D during mixing to the extent of 10 lbs of zinc per gallon of final product (12 lbs of zinc added to 1 initial gal of primer). The mixture was stirred 5–10 minutes with a mechanical stirrer, filtered through a 30-mesh screen, and sprayed to 5-mil dry-film thickness over sand-blasted steel. A commercial urethane topcoat (2-mil dry-film thickness) was applied to the cured primer. In 2 years of virtually horizontal exposure in Florida (5° exposure), the test primer performed as well as a proprietary inorganic zinc paint and better than an organic zinc-rich paint based on high molecular weight epoxy copolymers of bisphenol "A" and epichlorohydrin. Over sandblasted steel, it provided significantly better corrosion resistance than the composition without zinc.

Having described my invention, I claim:

1. A coating composition comprising at least one inert anhydrous organic solvent containing
   a binder formed from at least one polymeric polyol having 1–10% by weight of hydroxyl, a number average molecular weight of about 500–10,000 and a solubility of at least 30% by weight in the solvent;
   a pigment mixture containing (1) at least 20% by weight of a pigment in the form of platelets (2) about 1–5% by weight of carbon black, and (3) about 1–5% by weight of barium lanolate;
   the pigment/binder weight ratio being in the range of 60/100–600/100;
   an organic polyisocyanate; and
   dispersed therein, a finely divided sacrificial metal selected from the group consisting of zinc, aluminum and magnesium.

2. A coated article comprising a substrate carrying a cured coating composition of claim 1.

3. A coated article of claim 2 wherein the substrate is ferrous.

4. A coated article of claim 2 carrying a second coating superimposed thereupon.

* * * * *